United States Patent [19]

Obermaier

[11] Patent Number: 5,766,707
[45] Date of Patent: Jun. 16, 1998

[54] PLASTIC BALL

[75] Inventor: Anton Obermaier, Prien, Germany

[73] Assignee: Gebruder Obermaier oHG, Germany

[21] Appl. No.: 520,650

[22] Filed: Aug. 29, 1995

[30] Foreign Application Priority Data

Sep. 29, 1994 [DE] Germany .................. 44 34 889.4

[51] Int. Cl.[6] .................. B32B 7/02; B32B 27/08
[52] U.S. Cl. .................. 428/35.7; 33/732; 428/217; 428/424.6; 428/518; 473/604; 473/608
[58] Field of Search .................. 273/58 R, 58 A, 273/58 BA, 58 K, DIG. 5, DIG. 16; 428/420, 424.6, 518, 217, 35.7; 33/732; 473/604, 608

[56] References Cited

U.S. PATENT DOCUMENTS

| | | | |
|---|---|---|---|
| 4,169,594 | 10/1979 | Crane | 273/58 BA |
| 4,238,537 | 12/1980 | Kerr | 428/35 |
| 4,239,568 | 12/1980 | Takazawa | 156/155 |
| 4,258,917 | 3/1981 | Murphy | 273/65 ED |
| 5,096,756 | 3/1992 | Walters | 428/35.5 |
| 5,413,331 | 5/1995 | Stillinger | 273/58 BA |
| 5,580,049 | 12/1996 | Brantley | 273/65 B |

FOREIGN PATENT DOCUMENTS 69 18 355  5/1969  Germany.

*Primary Examiner*—H. Thi Le
*Attorney, Agent, or Firm*—Anthony J. Casella; Gerald E. Hespos; Ludomir A. Budzyn

[57] ABSTRACT

A plastic ball is disclosed, in particular a PVC air ball having a ball skin consisting of a skin base substance, in which a predetermined amount of stiffening material the hardness of which is greater than that of the skin base substance is added to the skin base substance.

22 Claims, 1 Drawing Sheet

PLASTIC BALL

BACKGROUND OF THE INVENTION

1. Field of the Invention. The present invention relates to a plastic ball having a ball skin consisting of a skin base substance.

2. Description of the prior Art. The known plastic balls have in general the problem that when their ball skin is cut or torn by a sharp object, the inner pressure and the possible exertion of load on the ball result in a widening of the cut so that, within a very short period of time, the tear widens and leads to the explosive bursting of the air ball.

Plastic balls having a diameter within the range of 45 to 75 cm are acted on by the weight of a person for therapeutic and play purposes. If such a ball comes into contact with a sharp object, for instance if a child plays with the ball on a stone floor, this can lead to the skin of the ball being torn. Due to the inner air pressure of the ball and the additional load on the ball due to the weight of the body of the person, the tear or hole in the skin of the ball widens very rapidly, so that the air contained therein can escape and the ball collapses. The person sitting or lying on the ball thus drops suddenly onto the ground, possibly even on the sharp object, which may result in serious injuries.

U.S. Pat. No. 4,169,594 discloses a ball which has two layers of different materials. In that case, an outer layer is formed of PVC and an inner layer of several different materials. The physical properties (for instance elasticity and hardness) of the inner layer can be controlled by the selection of these materials, the limit being established by the fact that the two layers remain attached to each other. A similar multi-layer ball is furthermore known from Federal Republic of Germany Utility Model 69 18 355.

The object of the present invention is therefore to provide a burst-proof plastic ball which does not suddenly collapse on itself in the event that the skin of the ball is torn, so that the danger of the person handling the ball being injured is reduced.

SUMMARY OF THE INVENTION

This object is achieved by a plastic ball having a ball skin consisting of a skin base substance in the manner that a predetermined amount of stiffening material the hardness of which is greater than that of the skin base substance is added to the skin base substance.

The ball skin of the plastic ball of the invention, particularly a PVC air ball, preferably has greater resistance to tearing or continued tearing, especially in expanded, pumped, or inflated condition. The greater resistance to tearing has the result, on the one hand, that it is more difficult for a sharp object to tear the skin of the ball and, on the other hand, that a tear which has formed in the skin of the ball cannot suddenly widen, so that the air can escape only slowly from the air ball and the ball does not suddenly collapse. In the event that the tear in the skin of the ball caused by the sharp object is present in a region which is not of a greater hardness, the tear widens due to the internal air pressure or the load on the ball until it reaches one of the distributed regions of greater hardness. A greater force must then be applied in order to widen the tear further. This force can, in general, not be applied by the internal air pressure or the load on the air ball, particularly if a part of the air has already escaped from the ball. Accordingly, the tearing process comes to an end and the air can only escape slowly through the small crack which has thus been defined. The person using the ball thus has time to move away from the ball. A decrease in the danger of injury to the person using the ball is thus obtained in advantageous manner.

Furthermore, the plastic ball of the present invention can be produced in advantageous manner, with little waste and thus at more favorable cost.

The plastic ball of the invention, due to the added stiffening material, furthermore has the advantageous property that after the application of load on the ball (for instance, by the weight of a person), the ball temporarily has a substantially elliptical shape in cross section or a flattening, this being counteracted again after some time. Due to this substantially elliptical shape, the ball does not roll away, particularly upon the release of the load, but rather oscillates or swings around a stable position. This property is of advantage, in particular, in plastic balls which are used for therapeutic purposes, since the danger of injury in particular to the patients is thereby reduced.

In a further preferred embodiment of the present invention, the stiffening material contains plastic, in particular acrylate or methacrylate, preferably alkyl acrylate or alkyl methacrylate, and with particular preference polymethyl methacrylate. In particular, the stiffening material advantageously contains a plastic which is compatible with the skin base substance. The stiffening material preferably enters into a bond with the skin base substance and can furthermore preferably be softened by a plasticizer present in the skin base substance.

In another preferred embodiment of the present invention, the stiffening material is present a proportion by weight of the plastic ball total weight of 1 to 30%, in particular 5 to 20%, preferably 10 to 17%, and with particular preference about 15 % of the total weight of the ball.

In one advantageous embodiment of the plastic ball of the invention, the stiffening material is in powder form and is preferably distributed substantially uniformly over the entire skin of the ball. Furthermore, the powdered stiffening material preferably has a particle size of a maximum dimension of 10 to 500 µm, in particular 20 to 100 µm, preferably 30 to 70 µm, and with particular preference 40 to 60 µm.

In another preferred embodiment, the plastic ball is an air ball of plasticized polyvinylchloride (PVC).

In another advantageous embodiment of the plastic ball of the invention, the stiffening material contains a hard sheet, preferably of PVC. The hard sheet preferably has a thickness within the range of 0.1 to 1 mm, and in particular 0.2 to 0.5 mm, and with particular preference 0.3 to 0.4 mm. The hard sheet preferably contains a proportion of plasticizer of 1 to 30% by weight, in particular 2 to 8% by weight and preferably about 5% by weight.

Furthermore, the surfaces formed by the stiffening material preferably have an irregular shape of dimensions within the range of 1 to 30 mm. The surfaces formed by the stiffening material account together for a percentage of 1 to 30% of the total surface of the ball.

In another preferred embodiment of the plastic ball of the invention, the stiffening material contains a solid plastic.

BRIEF DESCRIPTION OF THE DRAWINGS

Further advantages of the present invention will be explained by way of example in the following description of a few embodiments, read with reference to the drawings.

DETAILED DESCRIPTION OF THE PREFERRED EMBODIMENT

Figure 1:
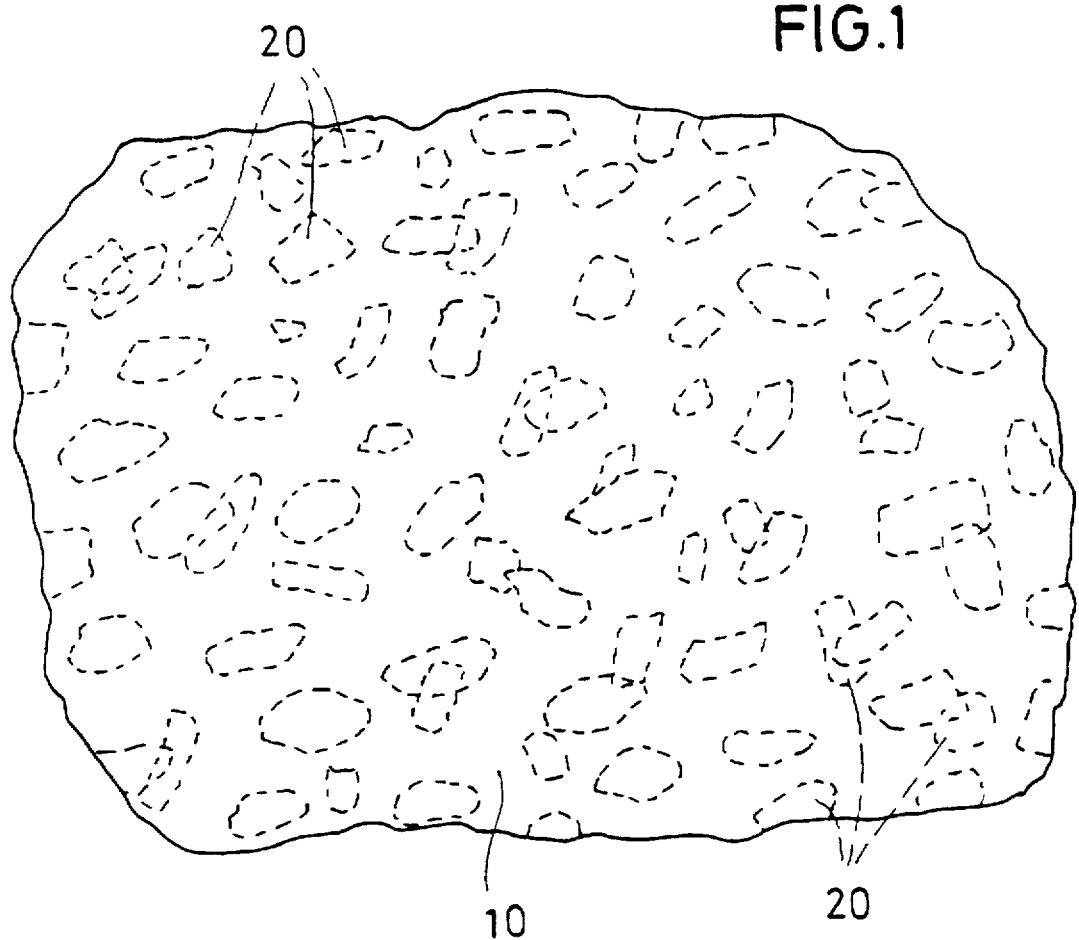
FIG. 1 is an outer view of the ball skin of one embodiment of the present invention.

The ball skin 10 shown in FIG. 1 has a stiffening material in the form of a plurality of distributed regions 20 which have a greater hardness or resistance to tearing. These distributed regions or volumes 20 account for about 3% by weight of the total weight of the ball. The distributed regions 20 are of an irregular shape the maximum dimension of which is within the range of 1 to 20 mm, and they correspond as a whole to a proportion of the surface of 1 to 20% of the total surface of the ball in its inflated as well as non-inflated state. Furthermore, the distributed regions 20 can either be distributed over the entire surface of the ball skin 10 or only over a predetermined part of the entire surface. The large number of distributed regions 20 can contain or consist of pieces of hard sheet of PVC. These pieces of hard sheet have a thickness within the range of 0.1 to 1 mm, preferably 0.2 to 0.5 mm, and with particular preference 0.3 to 0.4 mm. The hard sheet has a plasticizer percentage (of the PVC) of plasticizer substance (for instance dioctylphthalate (DOP), dinonylphthalate (DINP), dibutylphthalate (DIBP), benzylbutylphthalate (BBP), didodecylphthalate (DIDP), stabilizers, chlorinated polyolefins or nitrile rubber which lies within the range of 1 to 30%, preferably 2 to 8% and with particular preference about 3% of the PVC. The hard sheet can be of irregular shape with a dimension of 1 mm to 30 mm and can possibly contain a coloring component. It is produced by chopping hard sheeting web.

The ball skin 10 furthermore has a greater wall thickness at the distributed regions or volumes 20 than at the other regions. In this way, also, the resistance to tearing of the ball skin 10 is advantageously increased in these regions. Plastic balls having a plurality of distributed regions 20 of greater hardness and a diameter of 45 to 75 cm are produced. The chopped pieces of hard sheet account for 2 to 5% or 2 to 3% by weight of the total weight of the PVC. A preferred embodiment has a weight ratio of about 50–60 grams of hard-sheet pieces to 1600 grams of PVC, corresponding to about 3–4% by weight of the PVC.

Figure 2:
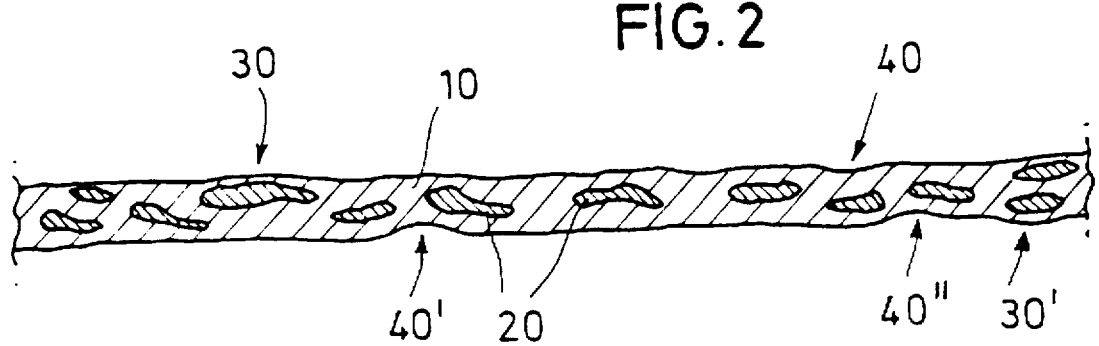
FIG. 2 is an enlarged cross section through the ball skin of FIG. 1.

The embodiment of a ball skin 10 shown in FIG. 2 has a plurality of distributed regions 20 of greater hardness which, viewed in cross section, can be distributed over the entire thickness of the ball skin 10. The thickness of the ball skin 10 is from 0.5 to 3 mm. In particular, the distributed regions 20 can also constitute the entire thickness of the ball skin 10. The plastic ball, furthermore, has upward bulges 30, 30' and downward bulges 40, 40', 40" on the distributed regions 20. There is thus produced an undulated surface or profile by which the resistance to slipping is advantageously increased.

In an embodiment not shown in the drawing, the ball can, in known manner, have one or more handles so that, for instance, a child can play with the ball by jumping around while seated on it. In the case of such a ball, the plurality of distributed regions 20 of greater hardness can be distributed in particular in the region opposite the handles, i.e. the region which preferably comes into contact with the ground. Thus, greater resistance to tearing or hardness in a lower region is obtained in order advantageously to assure less danger of bursting and thus of injury. The large number of distributed regions 20 of greater hardness can, in particular, however, also be distributed over the entire surface of the ball.

The plastic ball of the invention has a ball skin 10 which is formed of a skin base substance to which a given amount of stiffening material is added. In advantageous further developments, this stiffening material is polymethyl methacrylate (PMMA) or polyester or ethylene vinyl acetate (EVA). The stiffening material, in particular PMMA, has a hardness which is greater than that of the skin base substance of the ball skin 10, for instance plasticized PVC or PVC provided with plasticizer. The ball skin substance 10 has, in particular, a hardness of 40 to 60 Shore. The PMMA is added before the gelation or hardening of the PVC mass or paste and distributes itself homogeneously therein. Accordingly, the PMMA is uniformly distributed in the ball skin 10 and results in a high, previously unobtained, resistance to tearing.

In this embodiment, a tear remains limited, in particular, to the original tear by a sharp object and does not widen further at all. The surfaces of the torn ball skin 10 which border the tear have a rough surface, which surfaces are otherwise smooth, for instance, in the case of PVC without additives. This roughness results from the addition to the skin base substance of agents or materials for stiffening or hardening (for instance, PMMA) and is related to the high resistance to tearing.

The surface of the ball skin 10 has, in the case of the addition of PMMA, due to the hygroscopic properties of PMMA, a large number of small bubbles which cause, in addition to the addition itself, a rough or dull surface of the ball. This roughness advantageously results in improved resistance to slipping and thus a more dependable handling of the ball.

The addition of PMMA to the skin base substance, for instance plasticized PVC, furthermore has the result that, upon contact with the skin, the material has a more agreeable or warmer feel than plasticized PVC without addition of PMMA.

The stiffening material enters, in particular, into a bond, for example in the form of coherence or adherence, with the skin base substance, this bond being produced, for instance, by Van-der-Walls, polarization or ionic forces. In particular, a gap-less bond is present between stiffening material and skin base substance, so that upon a tear of the ball skin, the stiffening material does not readily separate from the skin base substance.

The stiffening material, for instance PMMA, is not "attacked" or softened or dissolved by plasticizers which are present in the skin base substance for the plasticizing or establishing of an elasticity of the skin base substance, so that the ball has resiliency or elasticity.

I claim:

1. A plastic ball having a ball skin consisting of a skin base substance, comprising a predetermined amount of an acrylate or methacrylate stiffening material, the hardness of which is greater than that of said skin base substance to which said stiffening material is added.

2. A plastic ball according to claim 1, wherein the stiffening material contains alkyl acrylate or alkyl methacrylate.

3. A plastic ball according to claim 2, wherein the stiffening material contains polymethyl methacrylate.

4. A plastic ball according to claim 1, wherein the stiffening material represents a portion by weight of 1 to 30% of the total weight of said plastic ball.

5. A plastic ball according to claim 4, wherein the stiffening material represents a portion by weight of 5 to 20% of the total weight of said plastic ball.

6. A plastic ball according to claim 5, wherein the stiffening material represents a portion by weight of 10 to 17% of the total weight of said plastic ball.

7. A plastic ball according to claim 6, wherein the stiffening material represents a portion by weight of about 15% of the total weight of said plastic ball.

8. A plastic ball according to claim 1, wherein the stiffening material is in powder form.

9. A plastic ball according to claim 8, wherein the particle size of the stiffening material has a maximum size of 10 to 500 μm.

10. A plastic ball according to claim 9, wherein the particle size of the stiffening material has a maximum size of 20 to 100 μm.

11. A plastic ball according to claim 10, wherein the particle size of the stiffening material has a maximum size of 30 to 70 μm.

12. A plastic ball according to claim 11, wherein the particle size of the stiffening material has a maximum size of 40 to 60 μm.

13. A plastic ball according to claim 1, wherein the stiffening material is distributed substantially uniformly over the said ball skin.

14. A plastic ball according to claim 1, wherein the plastic ball is an air ball which is made of plasticized polyvinylchloride.

15. A plastic ball according to claim 1, wherein the stiffening material contains chopped pieces of a hard sheet.

16. A plastic ball according to claim 15, wherein said surfaces formed by said pieces of chopped hard sheet have an irregular shape.

17. A plastic ball according to claim 16, wherein said irregular surfaces formed by said pieces of chopped hard sheet have dimensions within the range of 1 to 30 mm.

18. A plastic ball according to claim 16, wherein the surfaces formed by the stiffening material account as a whole for a percentage of 1 to 30% of the total surface of the ball.

19. A plastic ball according to claim 15, wherein said hard sheet has a thickness within the range of 0.1 to 1 mm.

20. A plastic ball according to claim 15, wherein said hard sheet has a thickness within the range of 0.2 to 0.5 mm.

21. A plastic ball according to claim 15, wherein said hard sheet has a thickness within the range of 0.3 to 0.4 mm.

22. A plastic ball according to claim 21, wherein said hard sheet has a percentage of plasticizer.

* * * * *

(12) REEXAMINATION CERTIFICATE (4318th)
United States Patent
Obermaier

(10) Number: US 5,766,707 C1
(45) Certificate Issued: Apr. 24, 2001

(54) PLASTIC BALL

(75) Inventor: Anton Obermaier, Prien (DE)

(73) Assignee: Gebruder Obermaier oHG, Prien (DE)

Reexamination Request:
No. 90/005,651, Feb. 28, 2000

Reexamination Certificate for:
Patent No.: 5,766,707
Issued: Jun. 16, 1998
Appl. No.: 08/520,650
Filed: Aug. 29, 1995

(30) Foreign Application Priority Data

Sep. 29, 1994 (DE) .................................. 44 34 889

(51) Int. Cl.$^7$ .............................. B32B 7/02; A63B 39/06
(52) U.S. Cl. ................... 428/35.7; 428/217; 428/424.6; 428/518; 473/604; 473/608; 33/732
(58) Field of Search .................... 428/35.7, 217, 428/424.6, 518; 473/604, 608; 33/732

(56) References Cited

U.S. PATENT DOCUMENTS 4,065,596 * 12/1977 Groody .................................. 428/215
5,185,404 * 2/1993 Folsch et al. ........................ 525/222
5,674,201 * 10/1997 Steinman ............................. 604/165
5,826,382 * 10/1998 Elsasser et al. ....................... 52/181

FOREIGN PATENT DOCUMENTS 1042326 9/1966 (GB) .............................. C08F/47/00
54-120667 9/1979 (JP).

OTHER PUBLICATIONS

Kirk–Othmer, *Encyclopedia of Chemical Technology*, Third Edition, vols. 1 (pp. 330–354 and 386–408)(1978), vol. 8 (pp. 459–469)(1979), vol. 15 (pp. 346–398)(1981), and vol. 18 (pp. 443–478), (1982).
*GE Specialty Chemicals*, Technical Data Sheets, "Blendex 869 Modifier Resin", 1991 and Jul. , 1993.
*GE Specialty Specialty Chemicals*, Technical Data Sheets, "Blendex 590 Modifier", 1989.

* cited by examiner

*Primary Examiner*—H. Thi Le

(57) ABSTRACT

A plastic ball is disclosed, in particular a PVC air ball having a ball skin consisting of a skin base substance, in which a predetermined amount of stiffening material the hardness of which is greater than that of the skin base substance is added to the skin base substance.

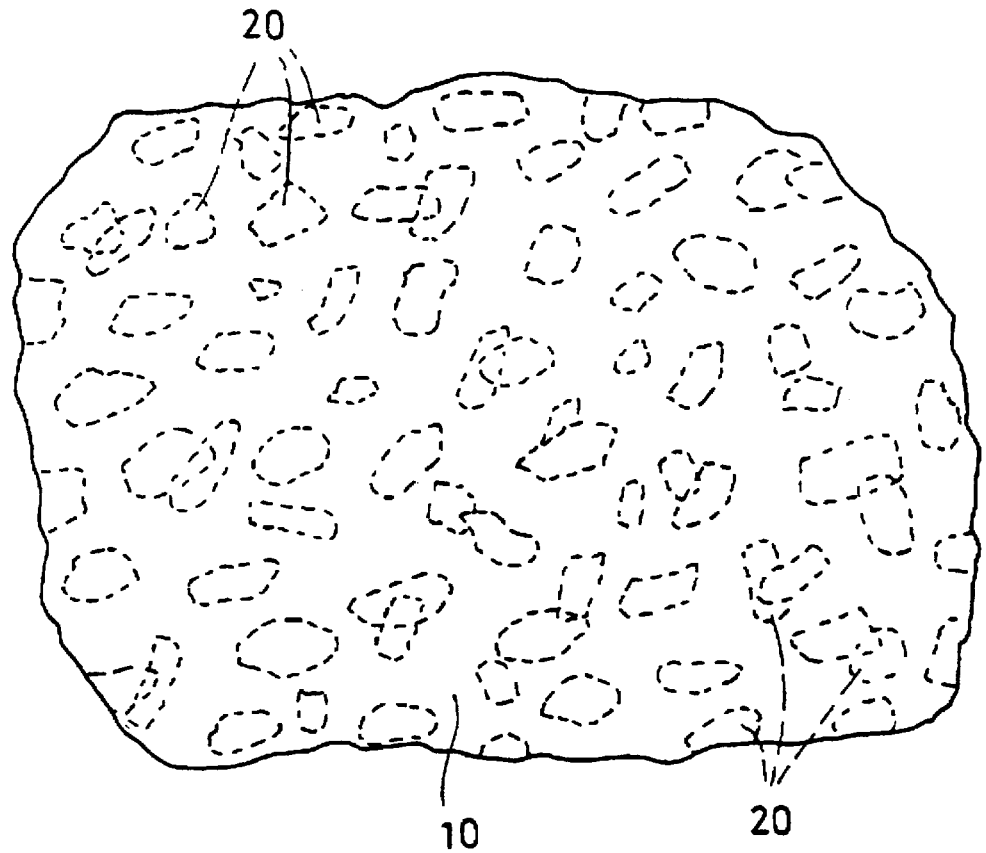

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *